(12) United States Patent
Kimura et al.

(10) Patent No.: US 9,100,663 B2
(45) Date of Patent: Aug. 4, 2015

(54) APPARATUS, METHOD, AND PROGRAM FOR VIDEO SIGNAL PROCESSING, AND STORAGE MEDIUM

(75) Inventors: Seiji Kimura, Chiba (JP); Masami Ogata, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 1391 days.

(21) Appl. No.: 12/110,909

(22) Filed: Apr. 28, 2008

(65) Prior Publication Data

US 2008/0278630 A1 Nov. 13, 2008

(30) Foreign Application Priority Data

May 11, 2007 (JP) .................. P2007-126233

(51) Int. Cl.
*H04N 5/21* (2006.01)
*H04N 19/85* (2014.01)
*H04N 5/911* (2006.01)

(52) U.S. Cl.
CPC .............. *H04N 19/85* (2014.11); *H04N 5/911* (2013.01)

(58) Field of Classification Search
CPC ................................. H04N 5/21; H04N 5/911
USPC .................................................. 348/607, 318
See application file for complete search history.

(56) References Cited

U.S. PATENT DOCUMENTS

| | | | | |
|---|---|---|---|---|
| 6,061,100 A * | 5/2000 | Ward et al. | | 348/607 |
| 6,320,909 B1 * | 11/2001 | Takabatake et al. | | 375/240.25 |
| 6,556,714 B2 * | 4/2003 | Kato | | 382/232 |
| 6,871,003 B1 * | 3/2005 | Phillips et al. | | 386/281 |
| 7,064,790 B1 * | 6/2006 | Varma et al. | | 348/441 |
| 7,747,100 B2 * | 6/2010 | Kim et al. | | 382/275 |
| 7,777,816 B2 * | 8/2010 | Chang et al. | | 348/620 |
| 2004/0179108 A1 * | 9/2004 | Sorek et al. | | 348/216.1 |
| 2004/0264802 A1 | 12/2004 | Kondo | | |

FOREIGN PATENT DOCUMENTS

| | | |
|---|---|---|
| JP | 06-030324 | 2/1994 |
| JP | 09-102936 | 4/1997 |
| JP | 2001-061081 | 3/2001 |
| JP | 2002-15327 | 1/2002 |
| JP | 2002-320111 | 10/2002 |
| JP | 2003-209716 | 7/2003 |
| JP | 2004-289746 | 10/2004 |
| JP | 2004-328635 | 11/2004 |
| JP | 2005-269542 | 9/2005 |
| JP | 2006-135571 | 5/2006 |
| JP | 2006-270417 | 10/2006 |
| JP | 2007-82040 | 3/2007 |
| WO | WO 2005/117474 | 12/2005 |

OTHER PUBLICATIONS

Notification of Reasons for Refusal with English language translation issued by Japanese Patent Office on Oct. 25, 2011 in corresponding Japanese application No. 2007-126233.

*Primary Examiner* — Olugbenga Idowu
(74) *Attorney, Agent, or Firm* — Finnegan, Henderson, Farabow, Garrett & Dunner, L.L.P.

(57) ABSTRACT

A video signal processing method includes the steps of processing an input video signal and outputting an output video signal, detecting a temporal feature from the input video signal, smoothing the temporal feature by filtering and outputting the smoothed temporal feature, and controlling processing performed in the processing step in accordance with the temporal feature smoothed in the smoothing step. In this method, the smoothing step switches a characteristic of the filtering in accordance with the attribute of the input video signal.

19 Claims, 14 Drawing Sheets

APPARATUS, METHOD, AND PROGRAM FOR VIDEO SIGNAL PROCESSING, AND STORAGE MEDIUM

CROSS REFERENCES TO RELATED APPLICATIONS

The present invention contains subject matter related to Japanese Patent Application JP 2007-126233 filed in the Japanese Patent Office on May 11, 2007, the entire contents of which are incorporated herein by reference.

BACKGROUND OF THE INVENTION

1. Field of the Invention

The present invention relates to video signal processing apparatuses, video signal processing methods, video signal processing programs, and storage media storing the video signal, processing programs, and is applicable to processing video signals generated by 2-3 pulldown. When temporal features of an input video signal are filtered to suppress variation in the temporal features, different filtering characteristics are used depending on the attribute of the input video signal. With this arrangement, even in processing of an input video signal generated by 2-3 pulldown, for example, stable video signal processing can be realized by effectively preventing deterioration of image quality due to a temporary change in the temporal features associated with a scene change.

2. Description of the Belated Art

In various video signal processing such as image enhancement, noise reduction, IP (interlace-progressive) conversion, and moving image compression, processing to be performed on an input signal is dynamically switched on the basis of temporal features of an input video signal. Temporal features herein refer to features of a video signal which change across consecutive fields or frames and are represented by a value indicating, for example, the amount of noise and the amount of motion. Specifically, the temporal features are calculated in units of pixels, blocks set in a field or a frame, fields or frames, or a predetermined number of fields or frames, etc. For example, the temporal features may be an inter-field or inter-frame difference in pixel values, a sum of the absolute values of the inter-field or inter-frame difference, a variance and a mean value of the difference, a pixel-based motion vector, a block-based motion vector, an encoding difficulty, etc.

FIG. 12 is a block diagram illustrating a basic configuration of a video signal processing apparatus which utilizes temporal features. In FIG. 12, a video signal processing apparatus 1 includes a temporal feature detecting unit 2, a control information generating unit 3, and a video signal processing unit 4. The temporal feature detecting unit 2 receives an input video signal S1 and detects a temporal feature 32. The control information generating unit 3 processes the temporal feature S2 and outputs control information S3 for controlling operations of the video signal processing unit 4. The video signal processing unit 4 processes the input video signal S1 and outputs an output video signal S4.

When the video signal processing to be performed by the video signal processing unit 4 is processing for reducing incise in the input video signal S1, the control information generating unit 3 processes the temporal feature S2 and generates the information control signal S3 on the basis of the temporal feature S2, so that the effect of the noise reduction processing increases with increasing noise in the input video signal S1. When the video signal processing to be performed by the video signal processing unit 4 is IP conversion, the control information generating unit 3 processes the temporal feature S2 and generates the information control signal S3 on the basis of the temporal feature S2, so that the effect of intra-field or intra-frame interpolation increases with increasing amount of motion contained in the input video signal S1. IP conversion refers to format conversion processing in which a video signal of an interlace format (interlace signal) is converted into a video signal of a progressive format (progressive signal) or vice versa, in this case, the video signal processing unit 4 performs format conversion on a video signal by interpolating a result of inter-field or inter-frame interpolation processing and a result of intra-field or intra-frame interpolation processing. The control information generating unit 3 controls an interpolation ratio applied to the interpolation operation using the information control signal S3.

In the video signal processing apparatus 1 having the above configuration, the temporal feature S2 detected by the temporal feature detecting unit 2 varies in time as illustrated in FIG. 13. Thus, the effect of processing of the output, video signal S4 varies in time along with the transition of the temporal feature S2. As a result, the visual quality of an image corresponding to the output video signal S4 is deteriorated.

To address this, a video signal processing apparatus 11 may be provided as illustrated in FIG. 15. Unlike the video signal processing apparatus 1 shown in FIG. 12, the video signal processing apparatus 11 includes a temporal feature smoothing unit 12. The temporal feature smoothing unit 12 smoothes a temporal feature S2 detected by a temporal feature detecting unit 2 and generates a smoothed temporal feature S5, as illustrated in FIG. 13. Using the smoothed temporal feature S5, a control information generating unit 3 generates control information S3. As a result, as illustrated in a broken line in FIG. 14, the video signal processing apparatus 11 prevents an abrupt temporary change in the effect of various processing in an output video signal S4. Note that the temporal feature smoothing unit 12 may be implemented as, for example, an IIR (infinite impulse response) filter or an FIR (finite impulse response) filter.

Techniques related to such video signal processing based on a temporal feature have been developed. For example, Japanese Unexamined Patent Application Publication No. 2002-15327 discloses a method in which a level of image enhancement is changed on the basis of a result of determination using a temporal feature as to whether or not an image is a natural image. Japanese Unexamined Patent Application Publication No. 2004-323635 discloses a technique relating to noise reduction processing. In this technique, a motion vector is used as a temporal feature and a reference value in measurement of a noise level is generated. In addition, Japanese Unexamined Patent Application Publication No. 2003-209716 discloses a method in which a noise level is measured from a temporal feature. Further, regarding IP conversion, Japanese Unexamined Patent Application Publication No. 2007-82040 discloses a method in which a field sequence associated with a 2-3 pulldown process is detected from a temporal feature and processing is switched in accordance with a detection result.

However, when the input video signal S1 is processed by smoothing the temporal feature S2 using the temporal feature smoothing unit 12, the smoothed temporal feature S5 may fluctuate over a plurality of fields or frames due to a temporary change in the temporal feature S2 which is associated with a scene change or the like, as illustrated in FIG. 16 and FIG. 17. This temporary change in the temporal feature S2 affects processing of a plurality of fields or frames, resulting in deterioration of image quality. Mote that FIG. 16 and FIG. 17 illustrate cases where an IIR filter and an FIR filter are implemented, respectively, as the temporal feature smoothing unit 12.

In addition, as illustrated in FIG. 18, the input video signal may be an interlace video signal generated by 2-3 pulldown. In this case, in the input video signal S1, consecutive even fields or odd fields include fields corresponding to the same original frame, which are illustrated as fields A1 and fields C2 in FIG. 18. In processing of such an input video signal S1, when the temporal feature S2 across different frames are detected, no change in the temporal feature S2 will be detected between the fields A1 and between the fields C2. This results in an abrupt temporary decrease in the temporal feature S2 as illustrated in FIG. 19 and FIG. 20 which, for comparison, correspond to FIG. 16 and FIG. 17, respectively. Thus, this also affects processing of a plurality of fields and frames, as in the case of a scene change, resulting in deterioration of the image quality.

SUMMARY OF THE INVENTION

The present invention has been made in view of the above circumstances. Accordingly, there is a need for a video signal processing apparatus, a video signal processing method, a program for the video signal processing method, and a storage medium storing the video signal processing program, which can effectively prevent deterioration of image quality due to a temporary change in temporal features and perform stable processing on a video signal even if the video signal is generated by 2-3 pulldown (2-3 pulldown signal).

According to an embodiment of the present invention, a video signal processing apparatus includes a video signal processing unit configured to process an input video signal and output an output video signal, a temporal feature detecting unit configured to detect a temporal feature from the input video signal, a smoothing unit configured to smooth the temporal feature by filtering and output the smoothed temporal feature, and a controlling unit configured to control processing performed in the video signal processing unit on the basis of the smoothed temporal feature. In this video signal processing apparatus, the smoothing unit switches a characteristic of the filtering in accordance with the attribute of the input video signal.

According to an embodiment of the present invention, a video signal processing method includes the steps of processing an input video signal and outputting an output video signal, detecting a temporal feature from the input video signal, smoothing the temporal feature by filtering and outputting the smoothed temporal feature, and controlling processing performed in the processing step in accordance with the smoothed temporal feature. In this method, the smoothing step switches a characteristic of the filtering in accordance with the attribute of the input video signal.

According to an embodiment of the present invention, a program for a video signal processing method in which an input video signal is processed and an output video signal is generated includes the steps of processing the input video signal and generating the output video signal, detecting a temporal feature from the input video signal, smoothing the temporal feature by filtering and outputting the smoothed temporal feature, and controlling processing performed in the processing step in accordance with the smoothed temporal feature. In this program, the smoothing step switches a characteristic of the filtering in accordance with the attribute of the input video signal.

According to an embodiment of the present invention, a storage medium storing a program for a video signal processing method in which an input video signal is processed and an output video signal is generated includes the steps of processing the input video signal and generating the output video signal, detecting a temporal feature from the input video signal, smoothing the temporal feature by filtering and outputting the smoothed temporal feature, and controlling processing performed in the processing step in accordance with the smoothed temporal feature. In this program, the smoothing step switches a characteristic of the filtering in accordance with the attribute of the input video signal.

According to an embodiment of the present invention, an input video signal is processed by smoothing a temporal feature, and filtering characteristics relating to the smoothing processing are switched in accordance with the attribute of the input video signal. With this arrangement, the filtering characteristics can be switched so that video signal processing is not affected by a temporal feature detected from fields corresponding to the same original frame in a 2-3 pulldown signal and by a temporal feature defected from fields associated with a scene change. Thus, even when an interlace signal generated by 2-3 pulldown is processed, deterioration of image quality due to a temporary change in the temporal feature associated with a scene change can be effectively prevented, and thus stable video signal processing can be realized.

DESCRIPTION OF THE PREFERRED EMBODIMENTS

In the following, the preferred embodiments of the present invention will be described in detail with reference to the accompanying drawings.

First Embodiment (1) Configuration of Video Signal Processing Apparatus

Figure 2:
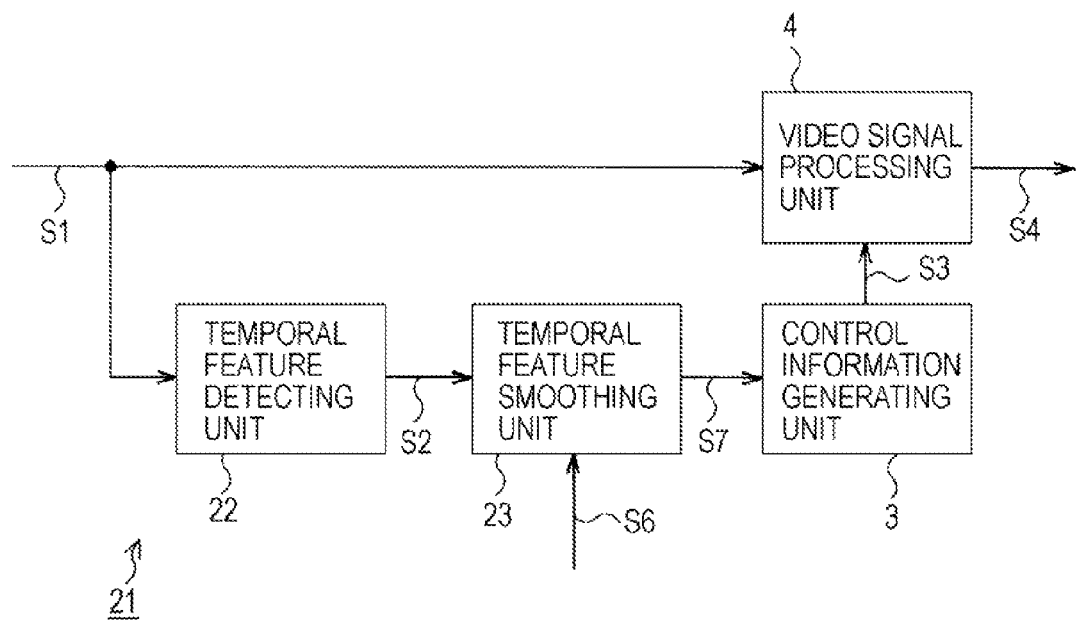
FIG. 2 is a block diagram illustrating a video signal processing apparatus according to an embodiment of the present invention.
Figure 12:
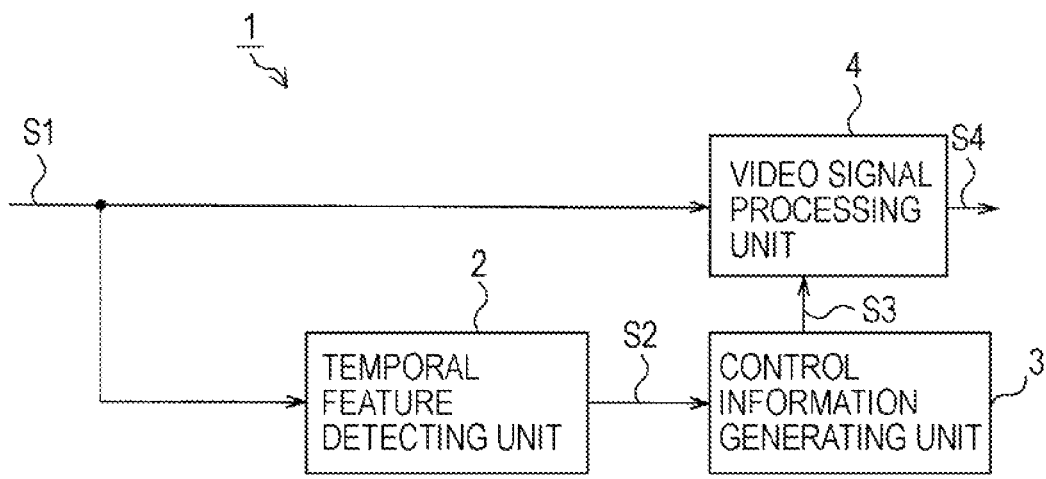
FIG. 12 is a block diagram illustrating a basic configuration of a video signal processing apparatus.
Figure 13:
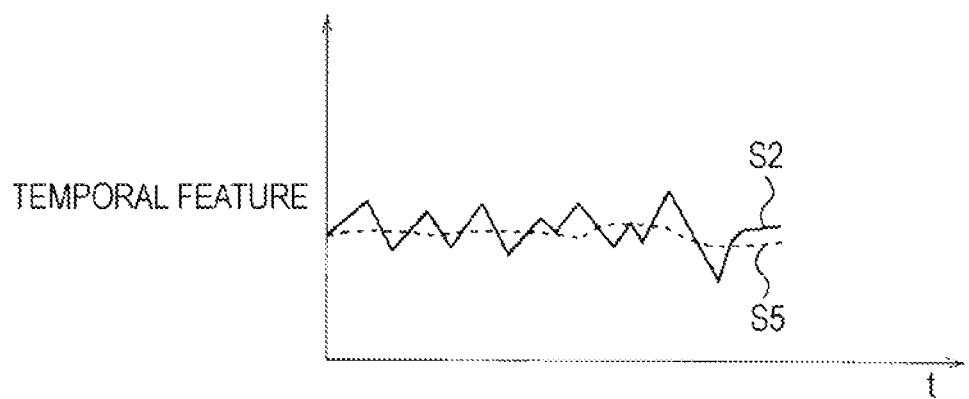
FIG. 13 is a characteristic curve illustrating a variation in a temporal feature.
Figure 14:
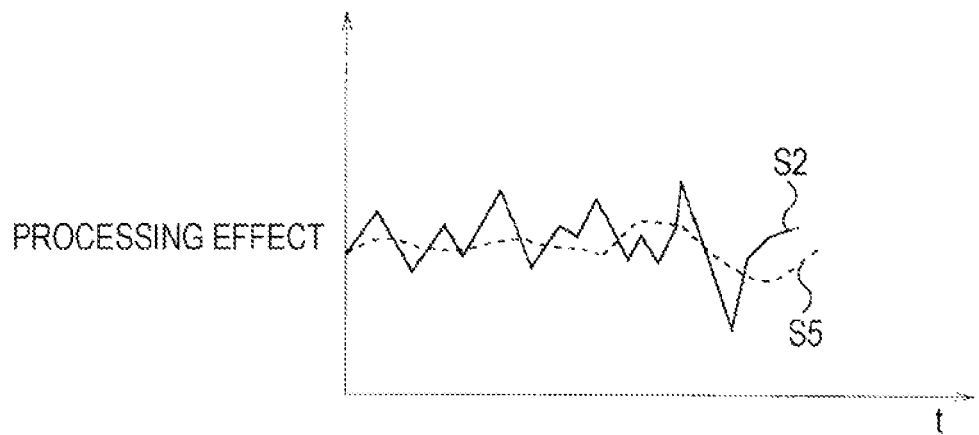
FIG. 14 is a characteristic curve illustrating video signal processing associated with the variation illustrated in FIG. 13.
Figure 15:
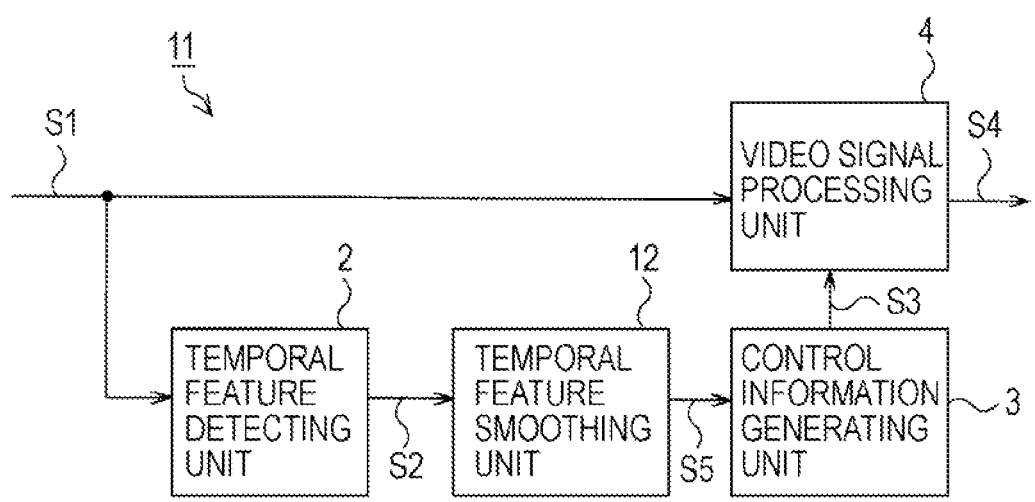
FIG. 15 is a block diagram illustrating a video signal processing apparatus having a temporal feature smoothing unit.

FIG. 2 is a block diagram illustrating a video signal processing apparatus according to an embodiment of the present invention. A video signal processing apparatus 21 includes components similar to those included in the video signal processing apparatuses 1 and 11 illustrated in FIG. 12 and FIG. 15, and these components are designated by the same reference numerals and the description thereof will be omitted herein. The video signal processing apparatus 21 in this embodiment is composed of a processor which processes an input video signal 31 by executing a predetermined program. In this embodiment, this program has been installed beforehand. However, it is also possible to execute the program stored in a storage medium such as an optical disk, a magnetic disk, and a memory card. The program may also be downloaded through a network such as the Internet.

In the video signal processing apparatus 21, a temporal feature detecting unit 22 detects a temporal feature S2 from the input video signal S1 and then a temporal feature smoothing unit 23 smoothes the temporal feature S2 to generate a smoothed temporal feature S7. On the basis of the smoothed temporal feature S7, a video signal processing unit 4 processes the input video signal S1. In this embodiment, the video signal processing unit 4 performs noise reduction processing on the input video signal S1. Thus, the temporal feature detecting unit 22 detects the temporal feature S2 represented by a value indicating an amount of noise. On the basis of the temporal feature S2, operation of the video signal processing unit 4 is controlled so that the effect of the noise reduction processing increases as the noise amount in the input video signal S1 increases.

Figure 3:
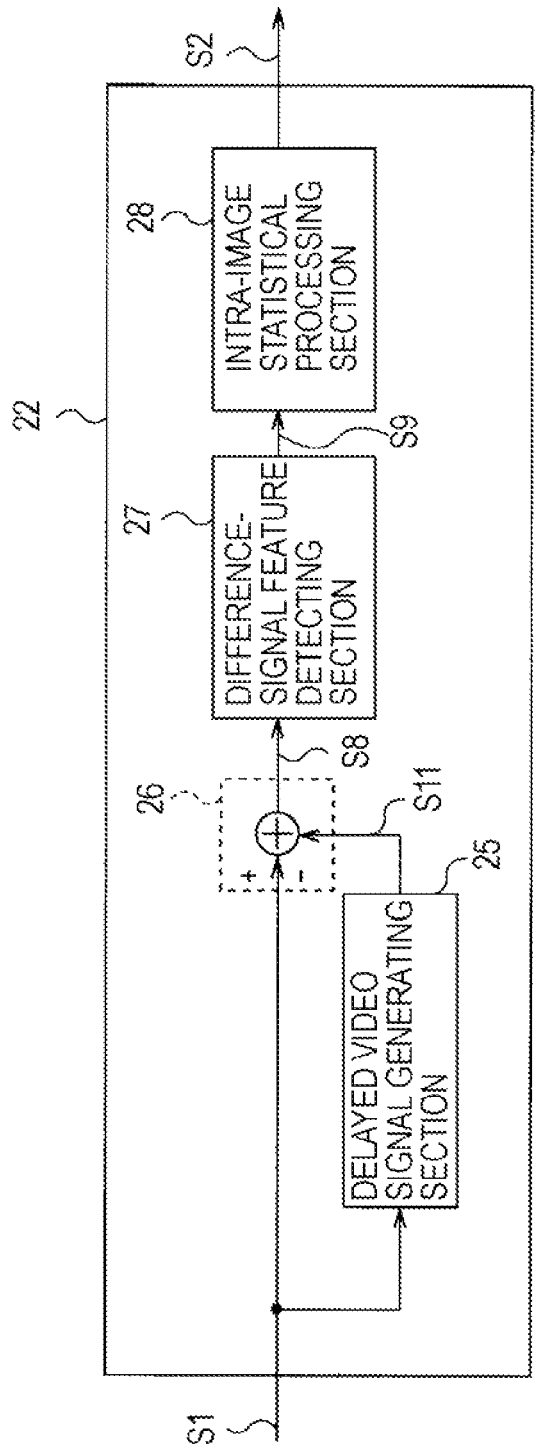
FIG. 3 is a block diagram illustrating a temporal feature detecting unit in the video signal processing apparatus in FIG. 2.

A configuration of the temporal feature detecting unit 22 is illustrated in FIG. 3. In the temporal feature detecting unit 22, a delayed video signal generating section 25 generates a delayed video signal S11 by delaying the input video signal S1 by a predetermined delay time. In this embodiment, this delay time may be a one frame period, i.e., a two-field period when the input video signal S1 is an interlace signal. However, the delay time may foe a time period corresponding to a desired number of fields or frames as necessary. In addition, when the temporal feature S2 is detected from the interlace input video signal S1 with a delay time of one field period, vertical filtering may be performed to correct vertical sampling phases which are different according to odd fields and even fields. Further, when the input video signal S1 is delayed, motion correction may be performed on the input video signal S1 to generate the delayed video signal S11.

The temporal feature detecting unit 22 also includes a difference signal generating section 26 and a difference-signal temporal feature detecting section 27. The difference signal generating section 26 is composed of a subtracter for subtracting the delayed video signal S11 from the input video signal S1 and outputting a difference signal S8.

Figure 5:
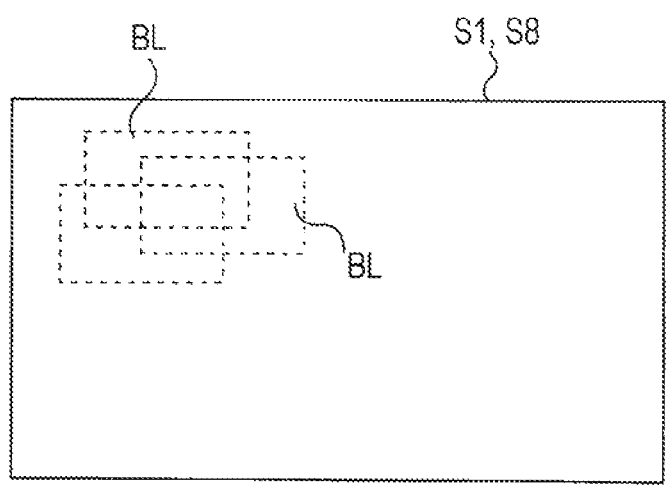
FIG. 5 illustrates another example of operation of a temporal feature detecting unit according to an embodiment of the present invention.

The difference-signal temporal feature detecting section 27 processes the difference signal S8 output from the difference signal generating section 26. Then, the difference-signal temporal feature detecting section 27 detects a temporal feature in the difference signal (difference-signal temporal feature S9) represented by a value indicating a noise amount, for each of blocks BL set by dividing one image of a field or frame of the input video signal S1 in the vertical and horizontal directions. Note that various statistical processing may be applied to the detection of the difference-signal temporal feature S9, including a mean square, a mean absolute value, a variance, a standard deviation, and a mean deviation of the difference signal S8. In addition, the blocks BL for the detection of the difference-signal temporal feature S9 may be superimposed on each other, as illustrated in FIG. 5.

The temporal feature detecting unit 22 also includes an infra-image statistical processing section 28. The intra-image statistical processing section 28 performs statistical processing on the difference-signal temporal features S9 for each image of a field or a frame of the input video signal S1 to prevent degradation of detection precision due to motion of an object in an image. The intra-image statistical processing section 28 then outputs the temporal feature S2 indicating a noise amount in the entire image. Note that various processes may be applied to the statistical processing, including average processing, median processing, and processing utilizing distribution in a histogram, for preventing degradation of detection precision due to a moving object.

Figure 1:
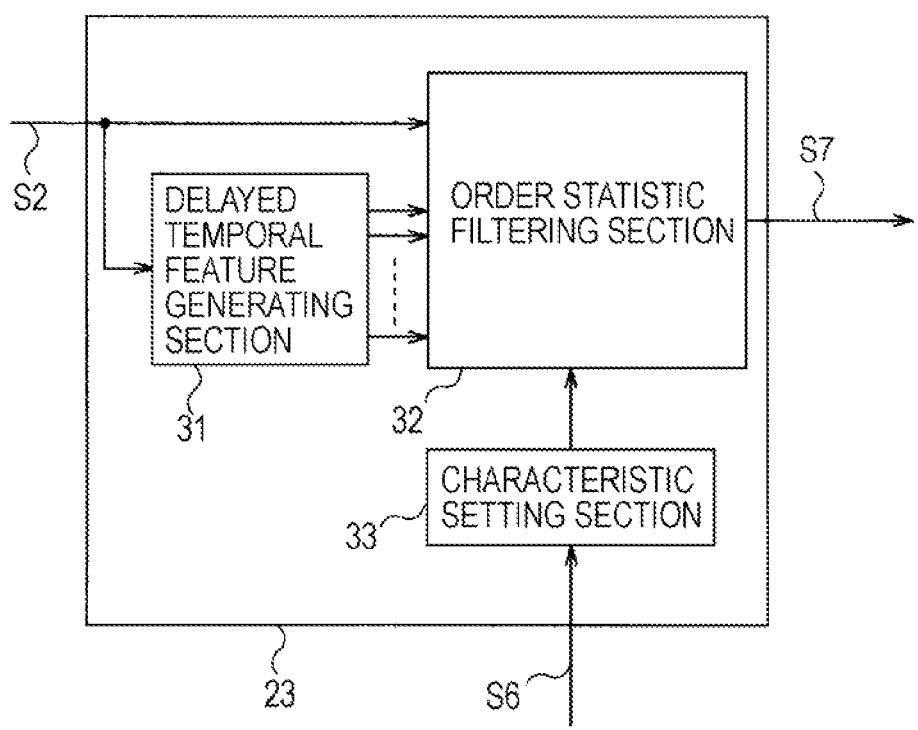
FIG. 1 is a block diagram illustrating a temporal feature smoothing unit implemented in a video signal processing apparatus according to an embodiment of the present invention.

FIG. 1 is a block diagram illustrating a configuration of the temporal feature smoothing unit 23. The temporal feature smoothing unit 23 includes a delayed temporal feature generating section 31, an order statistic filtering section 32, and a characteristic setting section 33. The delayed temporal feature generating section 31 sequentially delays the temporal feature S2 output from the temporal feature detecting unit 22 and outputs the delayed temporal feature S2 from a plurality of channels. Thus, the delayed temporal feature generating section 31 outputs a plurality of values of the temporal feature S2 of the input video signal S1 which are sequentially delayed by a predetermined number of fields or frames.

The order statistic filtering section 32 selectively receives values of the temporal feature S2 corresponding to a predetermined number of taps from among the plurality of values of the temporal feature S2 output from the delayed temporal feature generating section 31 and the temporal feature S2 output from the temporal feature detecting unit 22. Then, the order statistic filtering section 32 sorts the input values of the temporal feature S2 in the order from the largest to the smallest. On the basis of the result of the sorting, the order statistic filtering section 32 selectively outputs the values of the temporal feature S2 from the largest one to the smallest one, thereby smoothing the temporal feature S2. In this processing, the order statistic filtering section 32 switches the number of taps for the selective input of the temporal feature S2 from the delayed temporal feature generating section 31 and the order for the selective output of the temporal feature S2, in accordance with control performed by the characteristic setting section 33. Thus, the filtering characteristic used in the smoothing processing of the temporal feature S2 is switched by the control performed by the characteristic setting section 33.

The characteristic setting unit 33 receives information on the attribute of the input video signal S1 (attribute information S6) and switches the setting of the order statistic filtering section 32 in accordance with the attribute information 36. In this embodiment, the attribute information S6 is information for determining whether or not the input video signal 31 is a 2-3 pulldown signal and whether or not the input video signal S1 is an interlace signal.

In this embodiment, the video signal processing apparatus 21 is configured to process the input video signal S1 generated by decoding streaming data distributed by broadcast. Thus, the attribute information S6 may be identification information set in the header of the streaming data and meta-information of an EPG (electronic program guide). Specifically, the characteristic setting section 33 determines whether the input video signal S1 is a video signal generated by interlace scanning or progressive scanning on the basis of the identification information set in the header of the streaming data. In addition, the characteristic setting section 33 determines whether or not the input video signal S1 is based on a movie film on the basis of the EPG meta-information. At this time, the characteristic setting section 33 determines the input video signal S1 based on a movie film to be a 2-3 pulldown signal. Note that the attribute information may be information other than such header information and meta-information.

Further, the characteristic setting section 33 switches a characteristic of the order statistic filtering section 32 on the basis of a result of the above determination. In this case, the switching of the characteristic may be switching of the number of input taps for the filtering in the order statistic filtering section 32 and switching of the order of the data to be output from the order statistic filtering section 32.

Specifically, if the input video signal S1 is a 2-3 pulldown signal, the characteristic setting section 33 sets the filtering characteristic in the order statistic filtering section 32 to five-tap input and sets the order statistic filtering section 32 to selectively output the third largest input value of the temporal feature S2.

Figure 6:
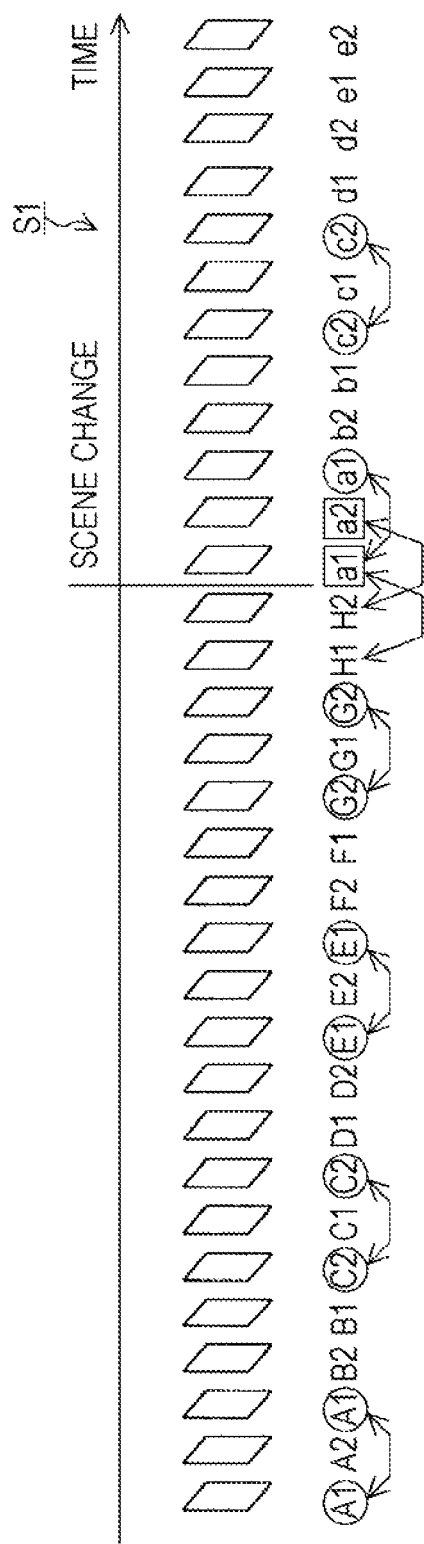
FIG. 6 schematically illustrates operation of a temporal feature smoothing unit according to an embodiment of the present invention.

Thus, in this embodiment, the delay time set in the delayed video signal generating section 25 is two fields, and thus a scene change affects the temporal feature S2 corresponding to consecutive two fields a1 and a2 illustrated in FIG. 6. Note that FIG. 6 illustrates consecutive fields of the input video signal S1 generated by 2-3 pulldown, each of which is designated by a reference character. In FIG. 6, the reference characters of fields which are generated from the same original film frame are enclosed by circles.

Therefore, the scene change affects the largest and second largest input values of the temporal feature S2 across five consecutive fields corresponding to the number of taps in the order statistic filtering section 32. Thus, the order statistic filtering section 32 performs filtering on the values of the input set of the temporal feature S2 other than the largest and second largest values, which are affected by the scene change. With this arrangement, the order statistic filtering section 32 can perform filtering on the temporal feature S2 without being affected by the scene change, as illustrated in FIG. 7.

When the input video signal S1 is generated by 2-3 pulldown, the temporal feature S2 is detected across different fields corresponding to the same original film frame, as illustrated in FIG. 6.

Figure 7:
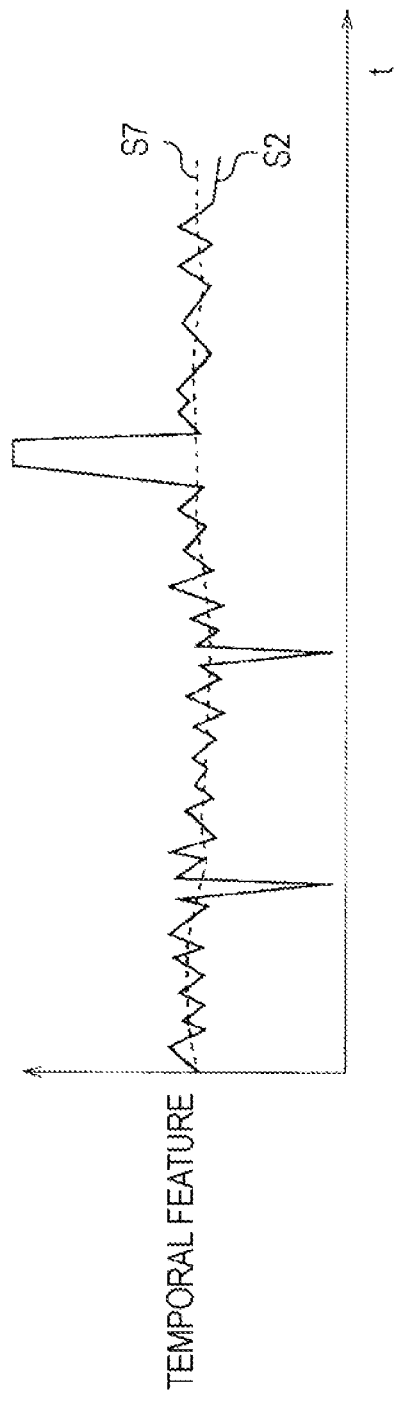
FIG. 7 is a characteristic curve illustrating operation of a temporal feature smoothing unit according to an embodiment of the present invention.

Thus, as illustrated in FIG. 7, in 2-3 pulldown, the third largest input value of the temporal feature S2 is output so that filtering is performed by omitting values of the temporal feature S2 corresponding to the same original frame which exhibit a temporary decrease. As a result, a variation in the smoothed temporal feature S7 can be prevented. In this embodiment, the number of input taps of the order statistic filtering section 32 is set to five. However, it is also possible to set more than five taps as the input taps of the order statistic filtering section 32 to achieve a similar processing effect.

On the other hand, when the input video signal S1 is not a 2-3 pulldown signal but is an interlace signal, only a scene change has to be taken into account for filtering processing. Thus, the characteristic setting section 33 switches the number of input taps of the order statistic filtering section 32 to be three, so that the order statistic filtering section 32 outputs the smallest input value of the temporal feature S2. In addition, when the input video signal S1 is not a 2-3 pulldown signal but is a progressive signal, the characteristic setting section 33 switches the number of the input taps of the order statistic filtering section 32 to two, so that the order statistic filtering section 32 outputs the smallest input value of the temporal feature S2. In these cases, the order statistic filtering section 32 may be configured to have a characteristic of a median filter having three or more taps.

[2] Operations

In the video signal processing apparatus 21 having the above configuration (FIG. 2), the temporal feature detecting unit 22 detects the temporal feature S2 from the input video signal S1, and the control information generating unit 3 generates control information S3 on the basis of the temporal feature S2. Then, on the basis of the control information S3, the video signal processing unit 4 reduces noise in the input video signal S1 and outputs the output video signal S4. With this processing, the video signal processing apparatus 21 can dynamically switch the processing to be performed on the input video signal S1 on the basis of the temporal feature S2 of the input video signal S1. In addition, the temporal feature S2 is smoothed by the temporal feature smoothing unit 23 and then the control information S3 is generated by the control information generating unit 3 on the basis of the smoothed temporal feature S7. This arrangement can prevent a variation in the effect of noise reduction due to a variation in the temporal feature S2 and also prevent deterioration of visual image quality.

Figure 16:
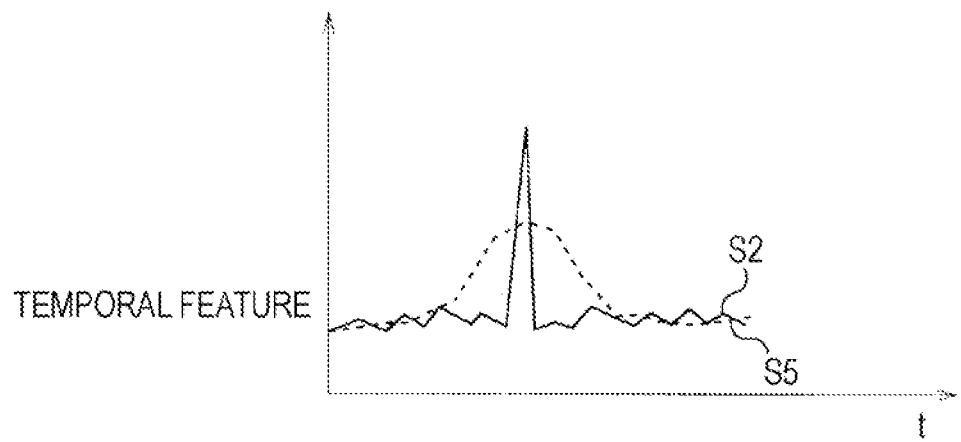
FIG. 16 is a characteristic curve illustrating the effect of a scene change.
Figure 17:
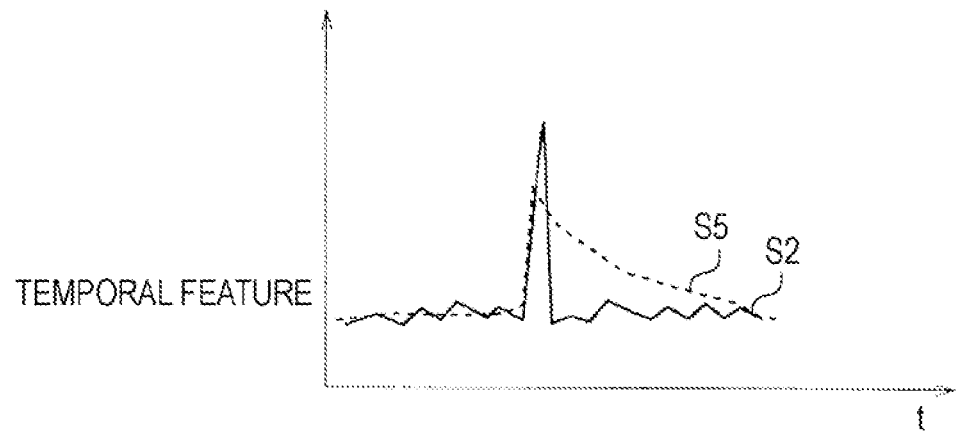
FIG. 17 is a characteristic curve illustrating the effect of a scene change in smoothing processing using an FIR filter.
Figure 18:
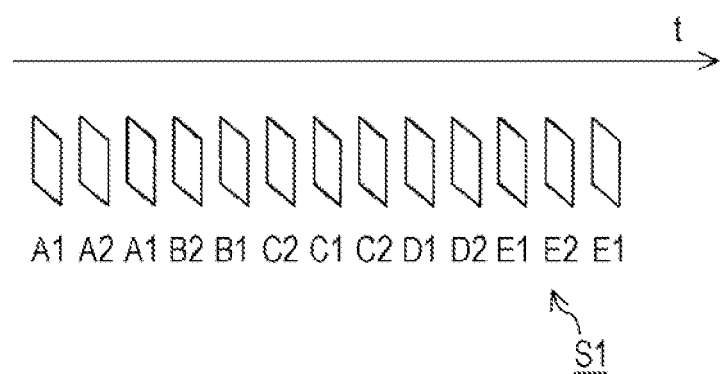
FIG. 18 schematically illustrates a 2-3 pulldown format.
Figure 19:
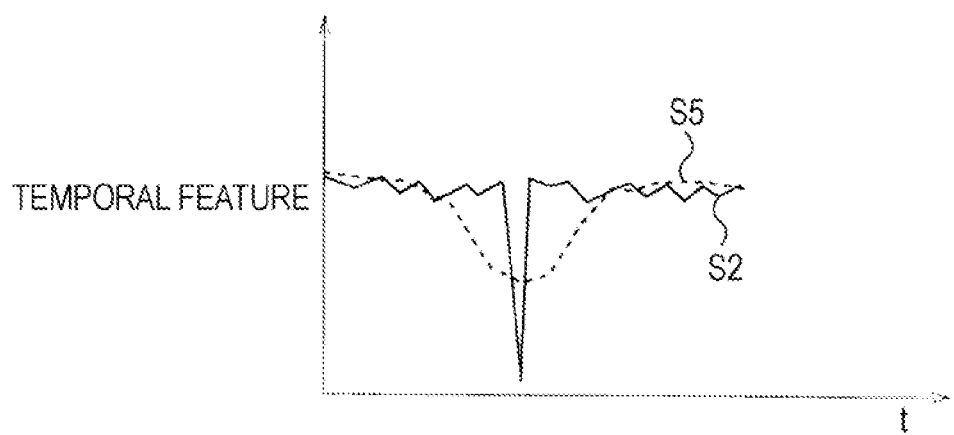
FIG. 19 is a characteristic curve illustrating a temporal feature of a signal in a 2-3 pulldown format.
Figure 20:
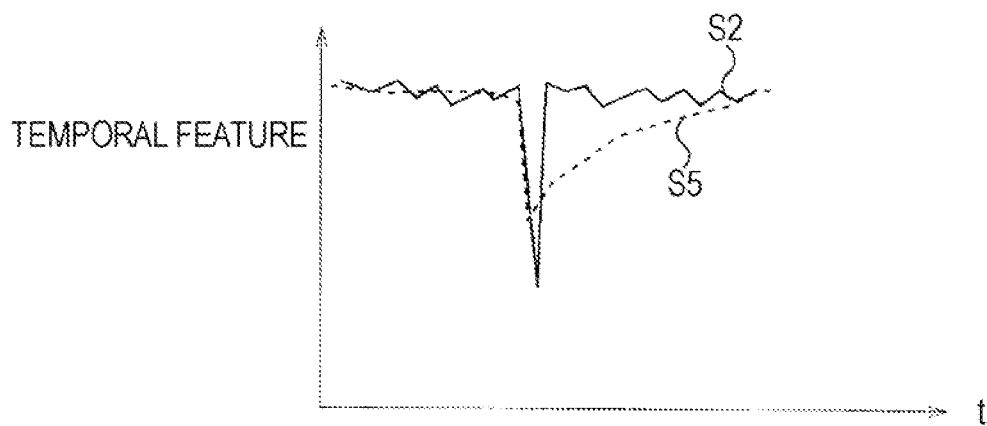
FIG. 20 is a characteristic curve illustrating a temporal feature of a signal in a 2-3 pulldown format in smoothing processing using an FIR filter.

However, with such simple smoothing of the temporal feature S2, an abrupt increase in the temporal feature S2 due to a scene change (as illustrated in FIG. 16 and FIG. 17) or an abrupt decrease in the temporal feature S2 due to a repetition of the same original film frame in a 2-3 pulldown signal (as illustrated in FIG. 19 and FIG. 20) affects a plurality of fields, resulting in deterioration of the image quality of the output video signal S4.

To address this, in this embodiment, the temporal feature S2 is sequentially delayed in the delayed temporal feature generating section 31 of the temporal feature smoothing unit 23 (FIG. 1). Then, values of the delayed temporal feature S2 output from a plurality of channels are filtered by the order statistic filtering section 32. The attribute of the input video signal S1 is determined by the characteristic setting section 33, and on the basis of the determination result, the characteristic of the filtering performed in the order statistic filtering section 32 is switched.

With this arrangement, in processing of the input video signal S1, such as a 2-3 pulldown signal, an interlace signal, and a progressive signal, the temporal feature S2 can be smoothed by omitting values of the temporal feature S2 detected from the fields corresponding to the same original film frame in the 2-3 pulldown signal and values of the temporal feature S2 detected from fields associated with a scene change (as illustrated in FIG. 6 and FIG. 7). Thus, in the video signal processing apparatus 21, the characteristic of filtering performed on the temporal feature S2 can be switched in accordance with the attribute of the input video signal S1. In addition, even when a scene change occurs or when an interlace video signal generated by 2-3 pulldown is to be processed, deterioration of the image quality due to a temporary change in the temporal feature S2 can be effectively prevented, and thus stable video signal processing can be achieved.

More specifically, in the temporal feature detecting unit 22 illustrated in FIG. 3, the difference-signal temporal feature detecting section 27 detects the difference-signal temporal feature S9 for each of blocks on an image, from the difference signal S8 corresponding to a difference between consecutive even fields and consecutive odd fields. Then, values of difference-signal temporal feature S9 are statistically processed by the intra-image statistical processing section 28, and the temporal feature 32 indicating a noise amount is detected for each field.

In addition, the delay time for the detection of the temporal feature S2 is two fields. Thus, when a 2-3 pulldown, signal is processed in the order statistic filtering section 32, the third largest input value is selected from among the input values of the temporal feature S2 across five consecutive fields, which are respectively input to five taps (i.e., the median of the values of the temporal feature S2). The selected median temporal feature S2 is output as the smoothed temporal feature 37. With this arrangement, in processing of the input video signal S1 generated by 2-3 pulldown, deterioration of image quality due to an abrupt increase in the temporal feature S2 associated with a scene change and deterioration of image quality due to an abrupt decrease in the temporal feature S2 due to a repetition of the same original film frame can be prevented.

On the other hand, the input, video signal S1 may not be a 2-3 pulldown signal. For example, in such a case, the characteristic of the order statistic filtering section 32 is set such that the number of taps is three for an interlace signal or two for a progressive signal, for example and the smallest value is output. This prevents deterioration of image quality associated with a scene change without excessive smoothing processing of the temporal feature S2. With appropriate smoothing processing of temporal feature S2, deterioration of image quality due to a variation in the temporal feature S2 can also be prevented.

[3] Advantages

According to the above configurations, when a temporal feature of an input video signal is filtered to suppress a variation in the temporal feature, characteristics of the filtering are switched in accordance with the attribute of the input video signal. With this arrangement, even when a interlace video signal generated by 2-3 pulldown is processed, for example, deterioration of image quality due to a temporary change in the temporal feature associated with a scene change can be effectively prevented, and thus stable video signal processing can be realized.

In addition, when video signal processing for noise reduction is performed, detecting a temporal feature from a difference signal of an input video signal allows dynamic switching of noise reduction processing in accordance with the attribute of the input video signal, so that the noise in the input video signal can be adequately reduced.

Further, the temporal feature is detected from the difference signal of the input video signal in units of blocks on an image of a field of a frame, and then statistical processing is performed on the values of the temporal feature corresponding to the individual blocks, for each image of a frame or field. With this arrangement, the temporal feature can foe readily detected for each image.

Moreover, by implementing an order statistic filter as a smoothing filter, the filtering characteristics related to smoothing processing on the temporal feature can be switched by simply switching the number of input taps and the order for selective output of values of the temporal feature.

Second Embodiment

Figure 8:
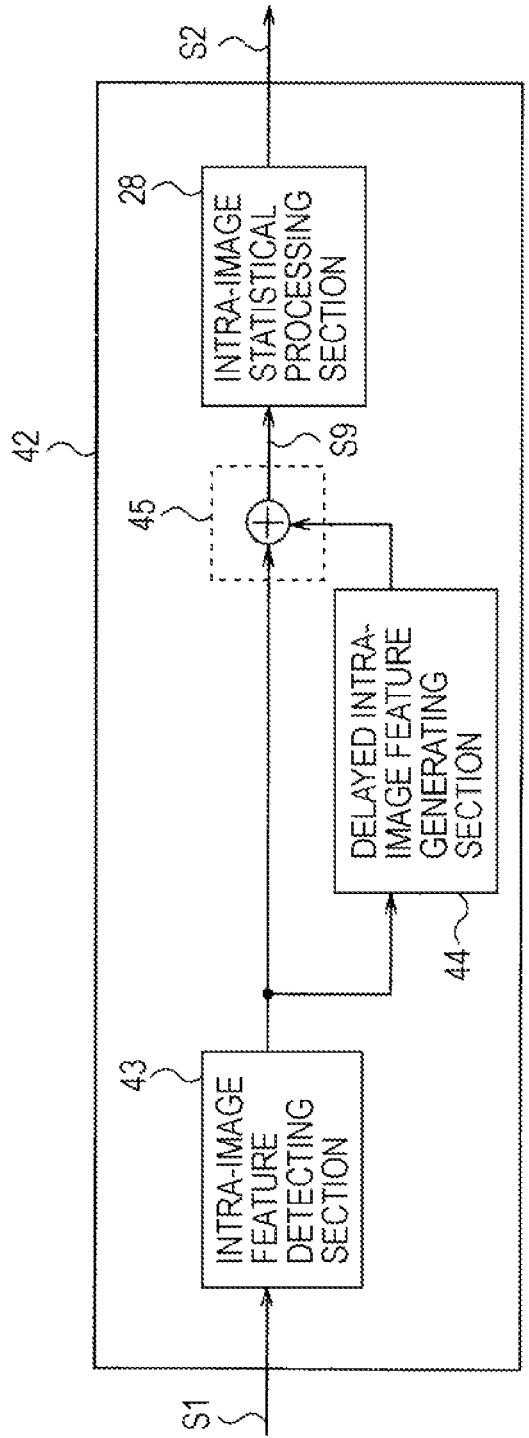
FIG. 8 is a block diagram illustrating a temporal feature detecting unit implemented in a video signal processing apparatus according to an embodiment of the present invention.

FIG. 8 is a block diagram illustrating a configuration of a temporal feature detecting unit implemented in a video signal processing apparatus according to a second embodiment of the present invention. The video signal processing apparatus in this embodiment have the same configuration as the video signal processing apparatus illustrated in FIG. 3 described above, except that it has a temporal feature detecting unit 42 instead of the temporal feature detecting unit 22, as illustrated in FIG. 8.

In the temporal feature detecting unit 42, a temporal feature of an input video signal S1 is detected by an intra-image feature detecting section 43. The detected feature is delayed by one frame by a delayed intra-image feature generating section 44. Then, a difference-signal feature detecting section 45 subtracts the delayed feature from the feature output from the intra-image feature detecting section 43 in units of blocks so that a temporal feature S9 is detected in units of blocks. Thus, in this embodiment, a temporal feature S2 is generated from an inter-frame difference or an inter-field difference of in the feature detected from the input video signal S1.

Figure 4:
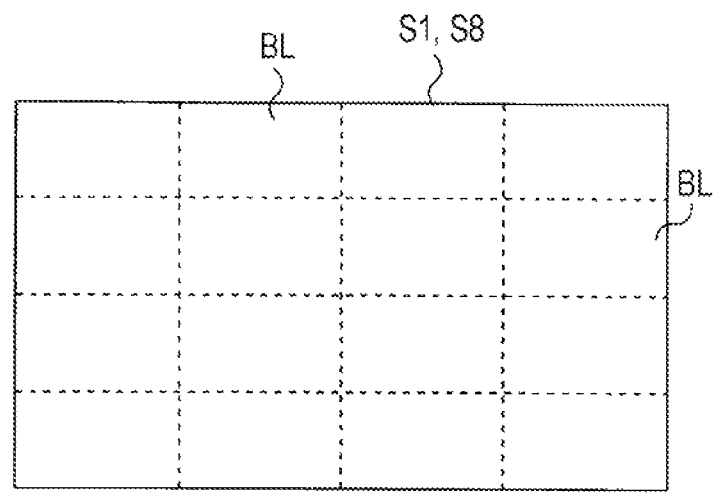
FIG. 4 illustrates an example of operation of a temporal feature detecting unit according to an embodiment of the present invention.

In the intra-image feature detecting section 43, a variance and a mean deviation of pixel values, and energy of high-pass filter output, etc. are detected for each of the blocks BL described in FIG. 4 and FIG. 5. Thus, the temporal feature S2 similar to the temporal feature S2 in the first embodiment can be detected through the difference-signal feature detecting section 45.

According to this embodiment, a feature of the input video signal S1 is first detected in units of blocks, and then a temporal feature is detected on the basis of an inter-field difference or an inter-frame difference. Thus, a processing effect similar to the first embodiment can be obtained with a reduced capacity of a memory used for generating delayed signals.

Third Embodiment

Figure 9:
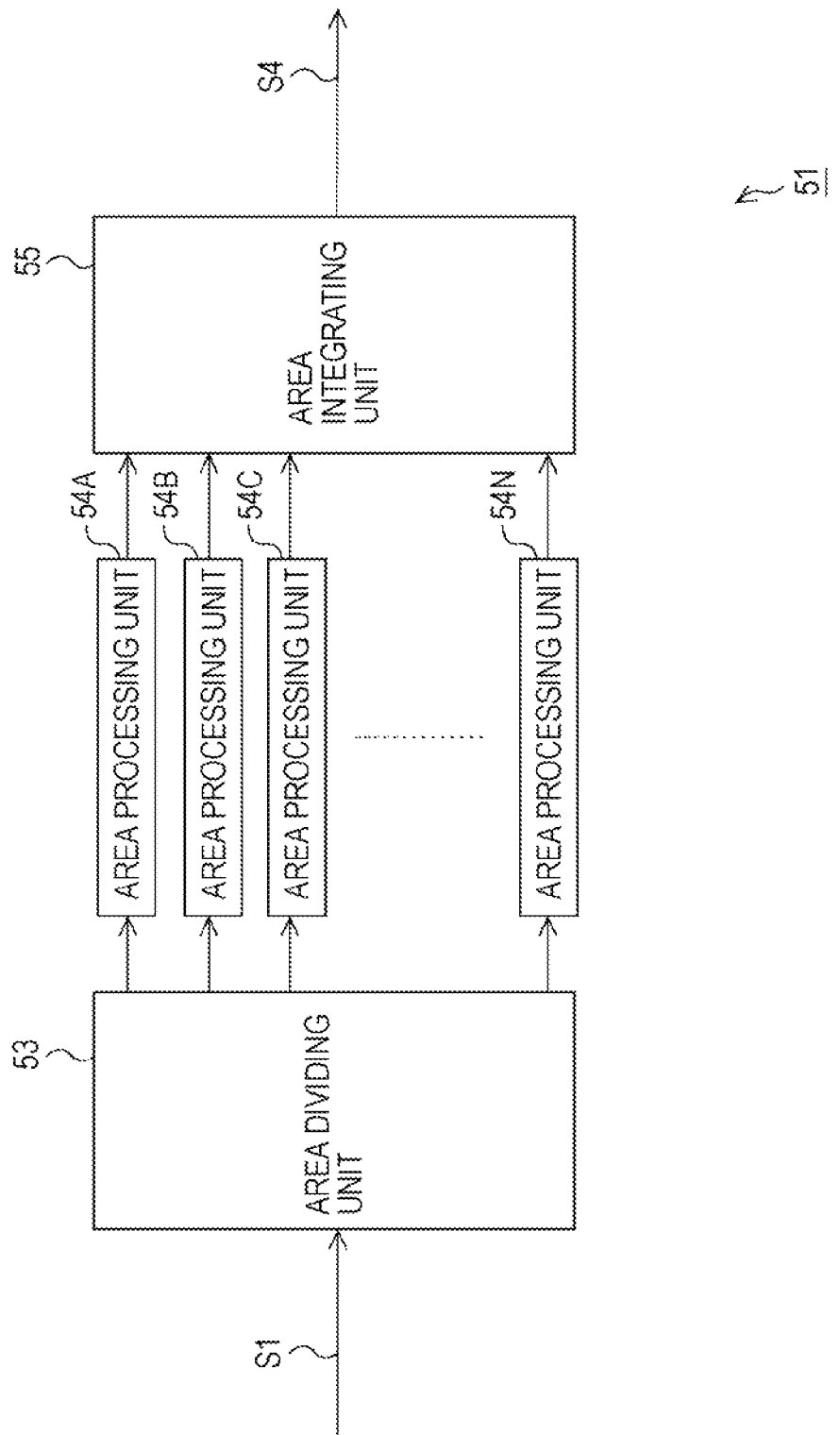
FIG. 9 is a block diagram illustrating a video signal processing apparatus according to an embodiment of the present invention.
Figure 10:
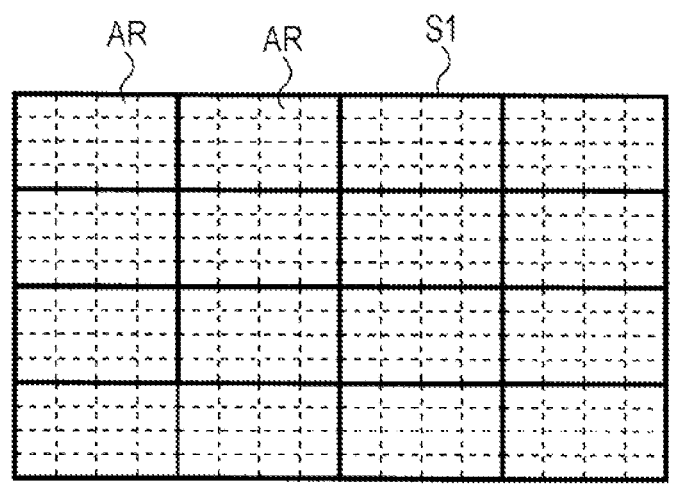
FIG. 10 illustrates an example of operation of a video signal processing apparatus according to an embodiment of the present invention.
Figure 11:
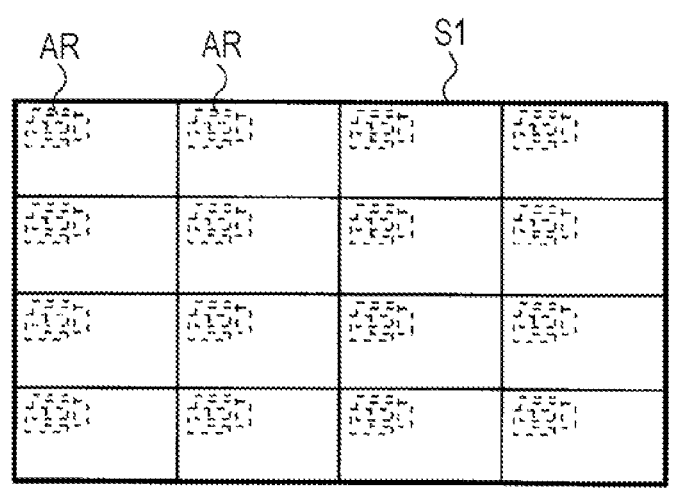
FIG. 11 illustrates another example of operation of a video signal processing apparatus according to an embodiment of the present invention.

FIG. 9 is a block diagram illustrating a video signal processing apparatus according to a third embodiment the present invention. In a video signal processing apparatus 51, an area dividing unit 53 outputs an input video signal S1 from a plurality of channels corresponding to individual areas AR set in the input video signal S1. Area processing units 54A to 54N are each configured similarly to the video signal processing apparatuses according to the first and second embodiments described above. Each of the area processing units 54A to 54N detects a temporal feature in a corresponding area AR and reduces noise in the area AR in the input video signal S1 on the basis of the detected temporal feature. Note that the areas AR are obtained by dividing each of the blocks BL illustrated in FIG. 4 and FIG. 5, as illustrated in FIG. 10 and FIG. 11.

An area integrating unit 55 integrates the input video signal S1 in the plurality of channels, in which the noise in each area AR is reduced, into one-channel signal and outputs an output video signal S4.

In the video signal processing apparatus 51 in this embodiment, the attribute information of the input video signal S1 is input for each of the channels of the input video signal S1 and a characteristic of filtering relating to smoothing processing is switched. Specifically, when two images are displayed by, for example, picture-in-picture display, the attribute information of a video signal from which the input video signal S1 is generated is supplied for each of areas in the individual displayed images.

In this embodiment, since noise in the input video signal S1 is reduced through a plurality of channels, the noise reduction processing can be dynamically switched and the filtering characteristic relating to smoothing of the temporal feature can be switched in accordance with the individual the attribute of the input video signal S1. This can further prevent deterioration of image quality and enhance noise reduction processing.

Specifically, in dual image display, picture-in-picture display, composite display of real video and computer graphics, or the like, the filtering characteristic relating to smoothing of a temporal feature can be appropriately switched for each area. This increases stability of video signal processing.

Fourth Embodiment

In the embodiments described above, signal processing to be performed on an input video signal is noise reduction. However, the present invention is not limited to this case and applied to various video signal processing utilizing temporal features. For example, the present invention may be applied to cases where a value indicating the amount of noise is used as a temporal feature and image enhancement is performed on an input video signal using a video signal processing unit, where a value indicating the amount of motion is used as a temporal feature and IP conversion of an input video signal is performed, and where a value indicating an activity level or the like corresponding to an encoding difficulty is used as a temporal feature and MPEG encoding is performed on an input video signal using a video signal processing unit. Note that in encoding of an input video signal, the amount of allocated codes may increase with increasing temporal feature.

In addition, in the above embodiments, abrupt changes in a temporal feature due to a scene change and 2-3 pulldown are taken into account. However, the present invention is not limited to this case and can be applied to a case where an abrupt change in a temporal feature due to a flash or the like is taken into account.

Further, in the above embodiments, a video signal processing apparatus is composed of a processor. However, the present invention is not limited to this case, and it is also possible to implement a video signal processing apparatus by hardware.

It should be understood by those skilled in the art that various modifications, combinations, sub-combinations and alterations may occur depending on design requirements and other factors insofar as they are within the scope of the appended claims or the equivalents thereof.

What is claimed is:

1. A video signal processing apparatus comprising:
a video signal processing unit configured to process an input video signal and output an output video signal;
a temporal feature detecting unit configured to detect a temporal feature from the input video signal;
a smoothing unit configured to smooth the temporal feature by filtering using a smoothing filter configured to reorder values of the temporal feature in accordance with a dynamically adjustable order, and selectively output values of the smoothed temporal feature; and
a controlling unit configured to control processing performed in the video signal processing unit in accordance with the smoothed temporal feature,
wherein:
the smoothing unit dynamically adjusts the dynamically adjustable order in accordance with an attribute of the input video signal.

2. A video signal processing method comprising the steps of:
processing an input video signal and outputting an output video signal;
detecting a temporal feature from the input video signal;
smoothing the temporal feature by filtering using a smoothing filter which reorders values of the temporal feature in accordance with a dynamically adjustable order, and selectively outputting values of the smoothed temporal feature; and
controlling processing performed in the processing step in accordance with the smoothed temporal feature,
wherein:
the smoothing step dynamically adjusts the dynamically adjustable order in accordance with an attribute of the input video signal.

3. The video signal processing method of claim 2,
wherein the detecting step includes the steps of:
delaying the input video signal to generate a delayed video signal;
generating a difference signal corresponding to a difference between the delayed video signal and the input video signal; and
detecting the temporal feature from the difference signal by processing the difference signal.

4. The video signal processing method of claim 3,
wherein the detecting step includes the steps of:
detecting the temporal feature from the difference signal in units of blocks set in the input video signal; and
performing statistical processing on the temporal feature detected in units of blocks, for each of images of the input video signal and detecting the temporal feature.

5. The video signal processing method of claim 3,
wherein a delay time in the delaying step is set as a predetermined field period or frame period.

6. The video signal processing method of claim 2,
wherein the smoothing filter is an order statistic filter.

7. The video signal processing method of claim 2, wherein the smoothing step determines the attribute of the input video signal from attribute information of the input video signal.

8. The video signal processing method of claim 2, wherein the detecting step includes the steps of:
detecting a feature from the input video signal; and
detecting an inter-field difference or an inter-frame difference in the feature and detecting the temporal feature.

9. The video signal processing method of claim 2, further comprising the step of dividing one image of the input video signal into blocks and outputting the input video signal from a plurality of channels, wherein in the processing step, the detecting step, the smoothing step, and the controlling steps, the input video signal is processed for each of the channels, and wherein the video signal processing method further includes the step of integrating results of processing of the plurality of channels performed in the processing step into one channel corresponding to the input video signal.

10. A non-transitory storage medium storing a program for a video signal processing method in which an input video signal is processed and an output video signal is generated, the program comprising the steps of:

processing the input video signal and generating the output video signal;

detecting a temporal feature from the input video signal;

smoothing the temporal feature by filtering using a smoothing filter which reorders values of the temporal feature in accordance with a dynamically adjustable order, and selectively outputting values of the smoothed temporal feature; and controlling processing performed in the processing step in accordance with the smoothed temporal feature, wherein:

the smoothing step dynamically adjusts the dynamically adjustable order in accordance with an attribute of the input video signal.

11. The video signal processing apparatus of claim 1, wherein the attribute of the video signal is part of a header of the input video signal or part of meta-information of an electronic program guide (EPG).

12. The video signal processing apparatus of claim 1, wherein the attribute of the video signal indicates whether the input video signal is a 2-3 pulldown signal.

13. The video signal processing apparatus of claim 1, wherein the attribute of the video signal indicates whether the input video signal was generated by interlace scanning or by progressive scanning.

14. The video signal processing method of claim 2, wherein the attribute of the video signal is part of a header of the input video signal or part of meta-information of an electronic program guide (EPG).

15. The video signal processing method of claim 2, wherein the attribute of the video signal indicates whether the input video signal is a 2-3 pulldown signal.

16. The video signal processing method of claim 2, wherein the attribute of the video signal indicates whether the input video signal was generated by interlace scanning or by progressive scanning.

17. The non-transitory storage medium of claim 10, wherein the attribute of the video signal is part of a header of the input video signal or part of meta-information of an electronic program guide (EPG).

18. The non-transitory storage medium of claim 10, wherein the attribute of the video signal indicates whether the input video signal is a 2-3 pulldown signal.

19. The non-transitory storage medium of claim 10, wherein the attribute of the video signal indicates whether the input video signal was generated by interlace scanning or by progressive scanning.

* * * * *